(12) United States Patent
Hartmann et al.

(10) Patent No.: US 7,177,785 B2
(45) Date of Patent: Feb. 13, 2007

(54) SYSTEMS AND METHODS FOR IMPROVED AIRCRAFT PERFORMANCE PREDICTIONS

(75) Inventors: Gary L. Hartmann, Fridley, MN (US); Brian E. O'Laughlin, Phoenix, AZ (US); Stephen G. Pratt, St. Louis Park, MN (US)

(73) Assignee: Honeywell International, Inc., Morristown, NJ (US)

( * ) Notice: Subject to any disclaimer, the term of this patent is extended or adjusted under 35 U.S.C. 154(b) by 560 days.

(21) Appl. No.: 10/645,705

(22) Filed: Aug. 22, 2003

(65) Prior Publication Data
US 2005/0043934 A1    Feb. 24, 2005

(51) Int. Cl.
G06F 7/60    (2006.01)
G06F 17/10    (2006.01)

(52) U.S. Cl. .......................................... 703/2
(58) Field of Classification Search ............... 703/2
See application file for complete search history.

(56) References Cited

U.S. PATENT DOCUMENTS 4,215,412 A * 7/1980 Bernier et al. ............. 701/100
5,070,458 A   12/1991 Gilmore et al.
5,457,634 A * 10/1995 Chakravarty ............... 701/3
5,606,505 A *  2/1997 Smith et al. ............... 701/99
5,908,176 A    6/1999 Gilyard
6,466,858 B1 * 10/2002 Adibhatla et al. .......... 701/100
6,502,085 B1 * 12/2002 Adibhatla et al. .......... 706/52

FOREIGN PATENT DOCUMENTS

EP    0253 614 A2    1/1988

* cited by examiner

*Primary Examiner*—Paul Rodriquez
*Assistant Examiner*—Juan Carlos Ochoa
(74) *Attorney, Agent, or Firm*—Fogg and Associates LLC; J. Patrick Kendrick

(57) ABSTRACT

The accuracy of flight management systems, based on mathematical prediction models calculated from aircraft specific data, are improved by adding engine sensor data to the calculations, checking sensor and pilot entered data, and comparing data measured from redundant sensors. A thrust estimate, calculated from available engine sensors, is added to the thrust-minus-drag aircraft model allowing prediction parameters to be accurately calculated even in a cruise condition. Sensor data and pilot entered data used in calculating predication parameters are checked to improve accuracy. Redundant sensor data is compared to determine the level of agreement. Redundant sensor data is also compared with a valid data range to find the sensor with the most accurate data.

47 Claims, 6 Drawing Sheets

SYSTEMS AND METHODS FOR IMPROVED AIRCRAFT PERFORMANCE PREDICTIONS

BACKGROUND OF THE INVENTION

1. Field of the Invention

Embodiments of the present invention relate to methods of improving the accuracy of flight management systems based on mathematical models of aircraft performance. In particular, the present invention pertains to a method of improving mathematical prediction models, which are calculated from aircraft specific data, by adding engine sensor data to the calculations, checking captured sensor and pilot entered data, and comparing data measured from redundant sensors.

2. Background of the Invention

Early methods of predicting aircraft performance characteristics were often based on "rules of thumb" in which a pilot, based on previous experience, makes a reasonable estimate of the aircraft performance characteristics. More recent aircraft performance prediction systems include a custom performance computer that utilizes "average parameters" for a predetermined model of an aircraft. While this computer-based system has significant advantages over the older "rules of thumb" method, the computer-based average parameter method is useful for only one aircraft type, and must be repeated for each new type of aircraft. The foregoing methods and systems have other inaccuracies and deficiencies. For example, the "rules of thumb" method is very inaccurate since it is difficult to compensate for temperature of the air, weight of the aircraft, etc. Also, this method usually adds to the pilot workload at a time when the pilot is already very busy. The custom performance computer method, because of the average parameter disadvantage, does not account for manufacturing tolerances, optional equipment, a degradation of parameters resulting from age and usage, nor for different pilot techniques.

U.S. Pat. No. 5,070,458 to Gilmore, et al., entitled "Method of Analyzing and Predicting both Airplane and Engine Performance Characteristics," issued Dec. 3, 1991, describes a method that overcomes many of the disadvantages of the prediction methods described above. The method described by Gilmore et al. makes performance predictions for an individual aircraft and engine using parameters that are learned from "flight to flight." The parameters are stored as data in a system database for subsequent recall, are initialized with reasonable values of specific performance parameters, and are adjusted or updated with new performance parameters resulting from each flight of the aircraft. Thus, the performance characteristics of a given aircraft are learned from flight to flight for use in future flights of the given aircraft. The learned parameter technique thereby adjusts to changes in the aircraft due to aging, is tailored to a specific aircraft, and accounts for manufacturing tolerances. However, in Gilmore, et al., the modeling utilized and the computation of terms thereof are inefficient. In addition, Gilmore et al. use a model that separates thrust and drag terms of the model when making predictions and is somewhat limited in the number of outputs produced. For example, Gilmore et al. do not provide for predictions of long range cruise speed or optimum altitude, which are important parameters for achieving the best possible fuel efficiency.

U.S. Pat. No. 5,606,505 to Smith, et al., entitled "Method of Airplane Performance Estimation and Prediction," issued Feb. 25, 1997, describes, in turn, a method that overcomes many of the disadvantages of Gilmore et al. This method produces an enhanced set of outputs which are provided with greater speed and/or accuracy. The estimating method used to predict performance characteristics in Smith et al. includes modeling the aircraft with at least one mathematical model using aircraft specific data and input parameters that define the performance characteristics. Coefficients of the mathematical model are learned during at least one flight, and climb and cruise performance characteristics are predicted as a function of the learned coefficients of the mathematical model. Performance characteristics predicted by this method include long range cruise speed, maximum cruise speed, optimum altitude at a certain cruise speed, maximum altitude at a certain cruise speed, the location of the top of climb, and total fuel burned for a given flight plan. One specific method of modeling the aircraft, described in Smith et al., is modeling the thrust-minus-drag of the aircraft. The predicted performance characteristics are then a function only of the non-independent or combination thrust-minus-drag relationship, and not of thrust and drag independently.

However, the modeling method of Smith et al. based on the thrust-minus-drag of the aircraft has at least one limitation. In a cruise condition, current acceleration is zero and the thrust-minus-drag equation will, therefore, equal zero. As a result, it is difficult to identify model parameters in a cruise condition. In practice, this effect has been observed as parameter "drift". In other words, the parameter estimates will wander, or predictions will be off if the aircraft spends a long time in cruise. Also, due to model mismatch, the observation matrix of the Kalman filter, described in Smith et al., is often full rank, which will tend to drive the parameter estimates to a zero solution. In view of the foregoing, it can be appreciated that a substantial need exists for a method of accurately calculating prediction parameters using a thrust-minus-drag model for all stages of flight, including a level, constant-speed cruise condition.

Another limitation of the method of Smith et al. is its total dependency on the accuracy of sensory or pilot entered data. If a sensor such as the fuel flow sensor fails, and this is not detected, parameter identification errors will result. Similarly, if a pilot enters erroneous data, such as the wrong initial weight of the aircraft, parameter identification errors will also occur. In view of the foregoing, it can be appreciated that a substantial need exists for improving the accuracy of estimated prediction parameters.

Finally, the method of Smith et al. does not utilize the redundant sensors and systems on aircraft. Generally, there are at least two of each of the types of sensors feeding data to the algorithm of Smith et al. For instance, there are typically two air data computers on an aircraft: one on the right side and one on the left. These computers collect two independent sets of the same data. Currently, the algorithm of Smith et al. is run on one set of this data. In view of the foregoing, it can be appreciated that a substantial need exists for improving the accuracy of estimated prediction parameters.

BRIEF SUMMARY OF THE INVENTION

Embodiments of the present invention relate to methods of improving the accuracy of predicting aircraft performance characteristics in flight management systems. One embodiment improves the process of estimating, and subsequently predicting, aircraft performance by increasing the number of input measurements available to the mathematical model. The process of estimating aircraft performance involves identifying parameters of a mathematical model that are learned during at least one flight. The process of predicting aircraft performance involves calculating performance characteristics from the identified parameters. A known method of modeling aircraft performance is based on the thrust-minus-drag equation of the aircraft. One parameter identification process for this model uses a "Thrust—Drag" Kalman filter with 11 states. In a level, constant-speed cruise condition, however, it is sometimes not possible to accurately identify these 11 parameters, because two of the inputs to the filter, acceleration and rate of climb, are zero. An embodiment of the present invention makes it possible to identify the model parameters by adding an additional input measurement to the Kalman filter that is not zero in cruise. Many modern aircraft now have on-board estimates of engine thrust computed from engine sensors. When estimates of engine thrust are added as an additional measurement to the Kalman filter, parameter estimation accuracy is improved.

In other embodiments of the present invention the accuracy of a flight management system is improved by checking the validity of sensor data and pilot entered data, and comparing readings from redundant sensors. The performance of a parameter identification algorithm depends on the quality of input data. This data may come from sensors on the aircraft, or may be entered by the pilot. One embodiment of the present invention improves the accuracy of the parameter identification algorithm by comparing sensor data or pilot entered data to a range of valid values stored in the flight management system. If the sensor data or pilot entered data is invalid, at least the pilot is notified.

A comparison of readings from redundant sensors is also preferably used to improve the accuracy of a flight management system. There are typically at least two of each of the types of sensors feeding data to the parameter identification algorithm, except for fuel flow and weight data, which tend to be from a single source. For instance, there are typically two air data computers on an aircraft. These computers collect two independent sets of the same data. In another embodiment of the present invention, readings from each redundant sensor that provides information to the parameter identification algorithm is compared with its partner. If any redundant sensor reading does not agree with its "partner" reading to within a predetermined acceptable tolerance then the algorithm is not run. In still another embodiment of the present invention, redundant sensor readings may be compared to a range of valid data values for that type of sensor stored in the flight management system. If at least one of the redundant sensor readings is within the valid range, then it is used in the algorithm. If none of the redundant sensor readings is within the valid range, then the algorithm is not run. The valid range may also be based on other sensor data (e.g. Mach range based on altitude) or even on predicted data (e.g. do not run the algorithm if the fuel at destination is predicted to be less than zero.)

The foregoing and other features of the present invention and the attendant advantages thereof will be more fully appreciated upon reading the following detailed description in conjunction with the drawings.

Figure 1:
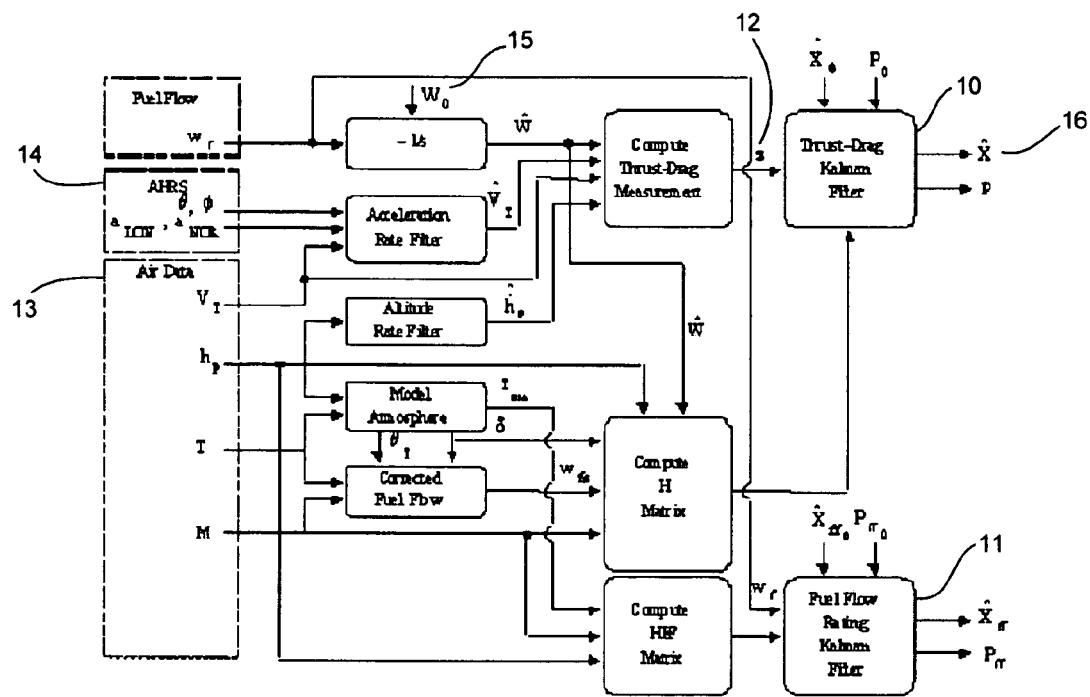
FIG. 1 is a schematic diagram of a parameter identification system used in the prior art.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

In one embodiment of the present invention, a thrust-minus-drag mathematical model of an aircraft is enhanced in two steps. In the first step, a thrust estimate is computed from data measured from at least one engine sensor. In the second step the thrust estimate is added to the thrust-minus-drag mathematical model. FIG. 1 is a schematic diagram of the parameter identification system of a mathematical model of an aircraft used in the prior art.

In this and other figures the following notation is used:

$w_f$=Fuel Flow
$w_{fc}$=Corrected Fuel Flow
$\theta$, $\phi$=Pitch and Roll Attitude of Aircraft
$a_{LON}$, $a_{NOR}$=Longitudinal and Lateral Acceleration of Aircraft
$V_T$=Velocity (true air speed)
$h_p$=Pressure Altitude
T=Temperature
M=Mach Number
$W_0$=Initial Aircraft Weight
$\hat{W}$=Estimated Aircraft Weight
$\hat{V}_T$=Estimated Aircraft Velocity
$\dot{\hat{h}}_p$=Estimated Altitude Rate
$\delta$=Atmospheric Pressure Rate
$\hat{X}$=State Estimate from Kalman Filter
P=Covariance Estimate from Kalman Filter
Subscript ff=Denotes Fuel Flow Kalman Filter This system uses two separate Kalman filters: a "Thrust—Drag" filter 10 with eleven states and a "Rated Fuel Flow" filter 11 with five states. The "Thrust—Drag" filter uses one thrust measurement z, 12, which can be considered as "excess thrust" and is computed from the measured air data 13, inertial attitude and acceleration measurements 14, and pilot entered aircraft weight 15. The eleven (seven for thrust and four for drag) states of this filter are denoted by the vector X 16. In cruise, the measurement z 12 has a value of zero, so it is not possible to identify model parameters. In practice, this effect has been observed as parameter "drift".

Also, due to model mismatch, the observation matrix is often full rank, which will tend to drive the parameter estimates to a zero solution.

Figure 2:
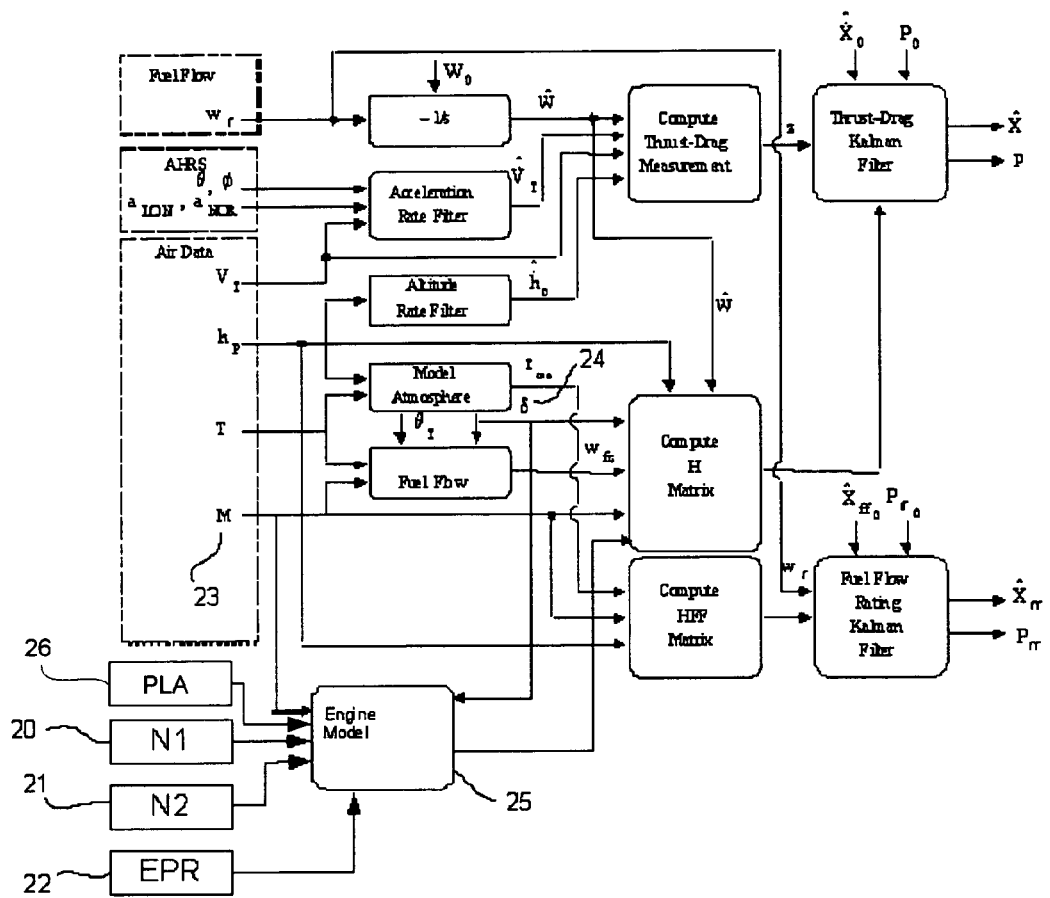
FIG. 2 is a schematic diagram showing a parameter identification system in accordance with the present invention.

FIG. 2 is a schematic diagram showing a system that improves the accuracy of parameter identification in accordance with the present invention. In this embodiment, the "Thrust—Drag" filter's performance is improved by adding a second thrust measurement to the filter that is not zero in cruise. Many modern aircraft now have on-board estimates of engine thrust computed from engine performance data obtained from engines sensors such as the rotational speed of a low pressure compressor (N1) 20, the rotational speed of a high pressure compressor (N2) 21, the engine pressure ratio (EPR) 22 (which is turbance discharge pressure/compressor inlet pressure), or power lever angle (PLA) 26 (also referred to as the throttle position as commanded by the pilot). The engine model may use data from one or more of these sensors. However, not all of these sensors would be expected to be available. For example, one aircraft has a thrust estimate computed as a function of N1 20, Mach number 23, and atmospheric pressure ratio 24.

Adding such an engine thrust computation or engine model 25 to the parameter identification method provides a second thrust measurement to the "Thrust—Drag" filter and improves the parameter estimation accuracy for a performance prediction algorithm. Offline analysis using a least squares algorithm has shown that adding this measurement allows correct parameters identification in cruise. In the Kalman filtering framework, a "noise term" can be included to represent the accuracy of such a model. In one possible implementation, the engine thrust measurement could be switched in only during cruise.

Figure 3:
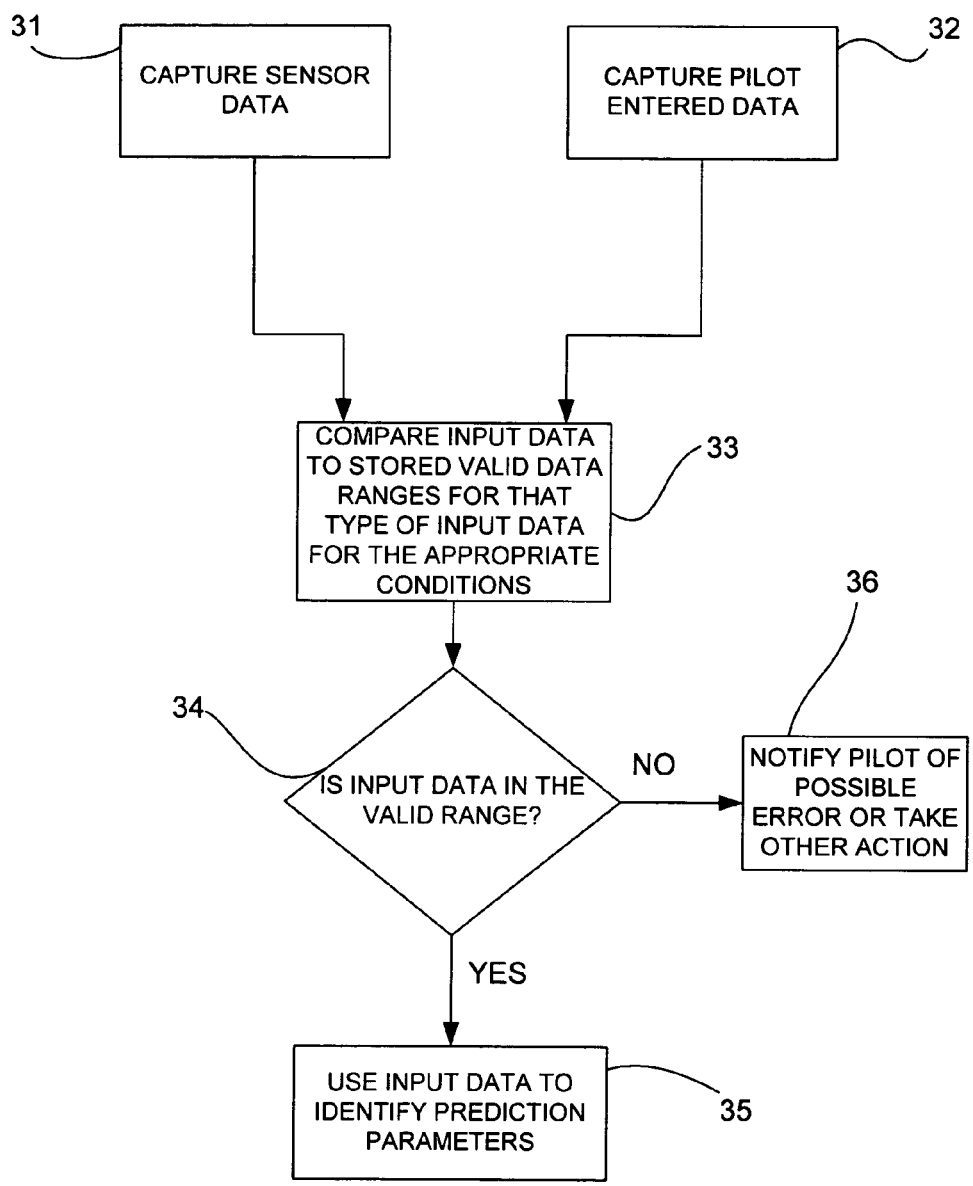
FIG. 3 is a flow chart of a method in which sensor data and pilot entered data are captured and compared to valid stored data in accordance with the present invention.

FIG. 3 is a flow chart of a method in which sensor data 31 and pilot entered data 32 are captured and compared to valid stored data in accordance with the present invention. In this method, both data measured from sensors and pilot entered data are captured and compared to retrieved valid data ranges for each type of sensor for the appropriate conditions, computed data, or pilot entered data 33. A decision is made based on the comparison at step 34. If the data is in the valid range, it can be used to identify prediction parameters at step 35. If the data is not in the valid range, a pilot is notified of a possible error or other action, such as updating a database, is taken at step 36. Using this method, the quality of the data given to the parameter identification algorithm is enhanced. The valid range may depend on other sensor or pilot entered data or even on the estimated parameters (e.g. the performance predictions).

Figure 4:
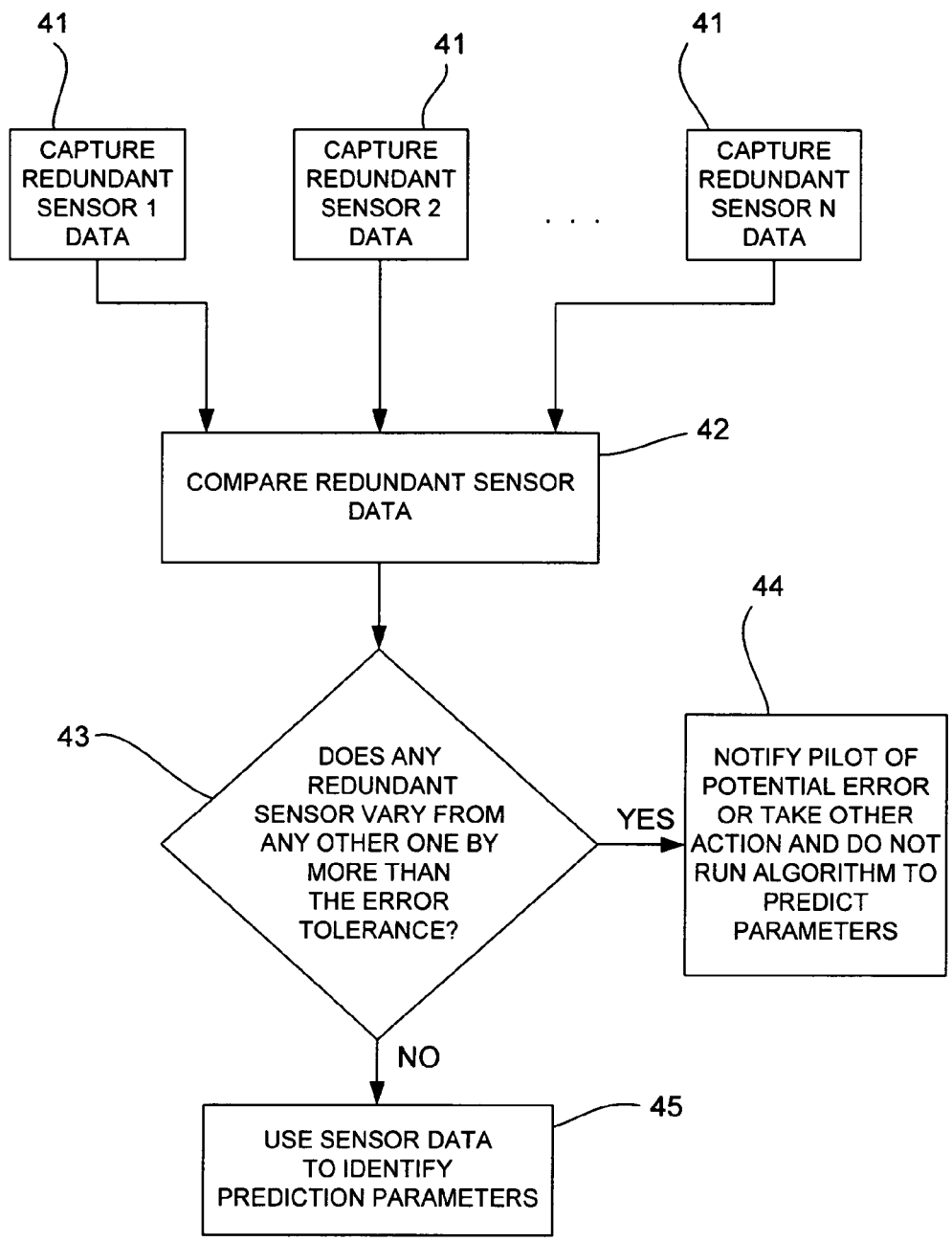
FIG. 4 is a flow chart of a method in which redundant sensor data is captured and compared to determine if that data matches to within an error tolerance in accordance with the present invention.

FIG. 4 is a flow chart of a method in which redundant sensor data is captured and compared to determine if that data matches to within a stored error tolerance in accordance with the present invention. There are usually at least two sensors for each type of data used by the algorithm which identifies the prediction parameters. There may, however, be more than two. Data measured from each redundant sensor is captured at step(s) 41 and compared to the data of every other redundant sensor of the same type at step 42. One skilled in the art will appreciate that captured redundant sensor data at step(s) 41 may include pilot entered data. A decision at step 43 is made based on the comparison. If any redundant sensor varies from any other redundant sensor of the same type by more than the retrieved tolerance that represents an error, then a pilot is notified or other action, such as updating a database, is taken and the algorithm is not run (step 44). If all redundant sensors vary by the error tolerance or less than the retrieved error percentage, the algorithm to identify prediction parameters is executed at step 45.

Figure 5:
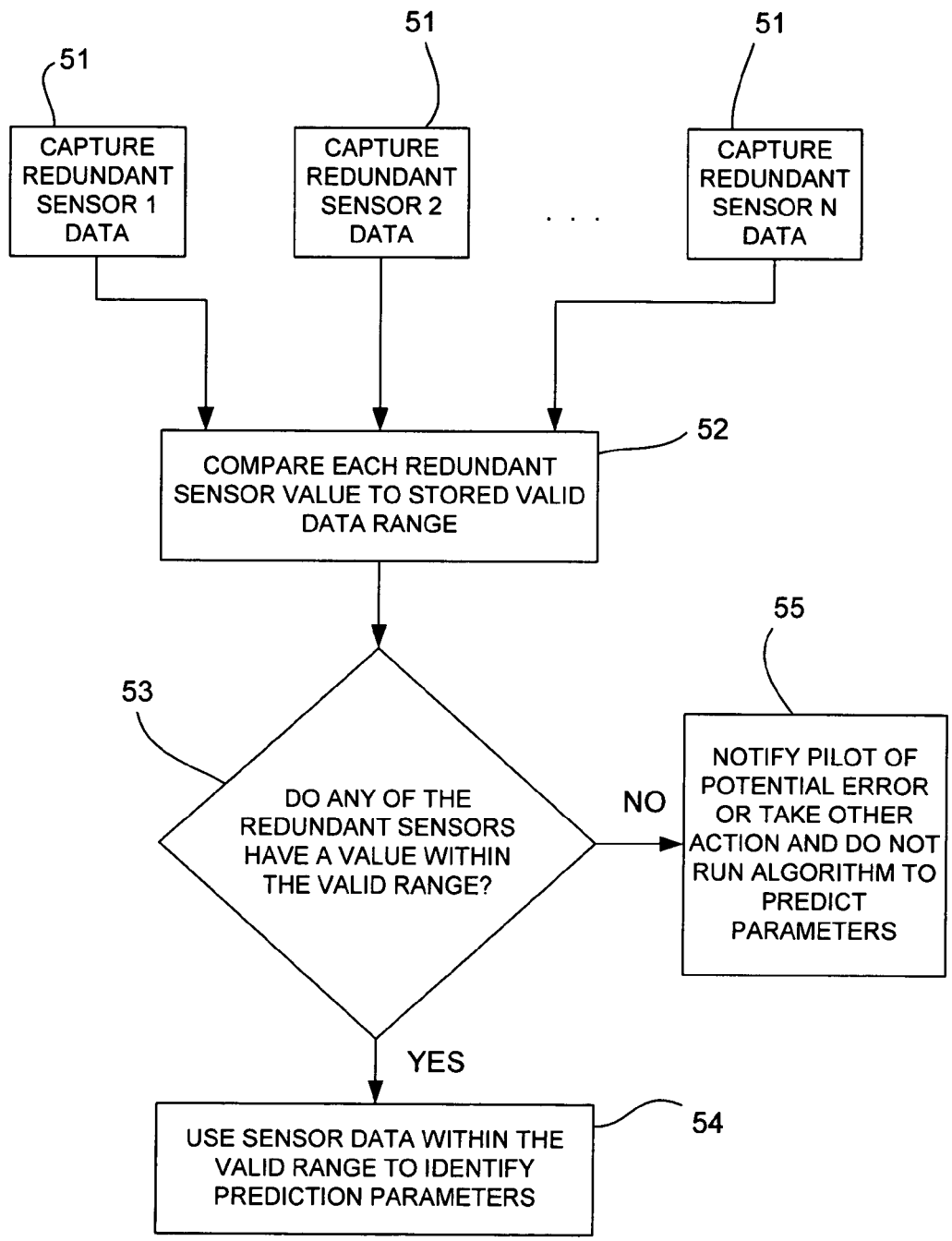
FIG. 5 is a flow chart of a method in which each redundant sensor measurement is captured and compared to valid stored data in accordance with the present invention.

FIG. 5 is a flow chart of a method in which each redundant sensor measurement is captured and compared to valid stored data in accordance with the present invention. In this embodiment the values of each of the redundant sensors are captured at step(s) 51 and compared, at step 52, to retrieved valid data ranges for that type of sensor. One skilled in the art will appreciate that captured redundant sensor data at step(s) 51 may include pilot entered data. A decision, at step 53, is made based on the comparison. If any of the redundant sensors is within the valid range, it is used to identify prediction parameters at step 54. If none of the redundant sensors is within the valid range, a pilot is notified or other action, such as updating a database, is taken and the algorithm to identify prediction parameters is not executed (step 55).

Figure 6:
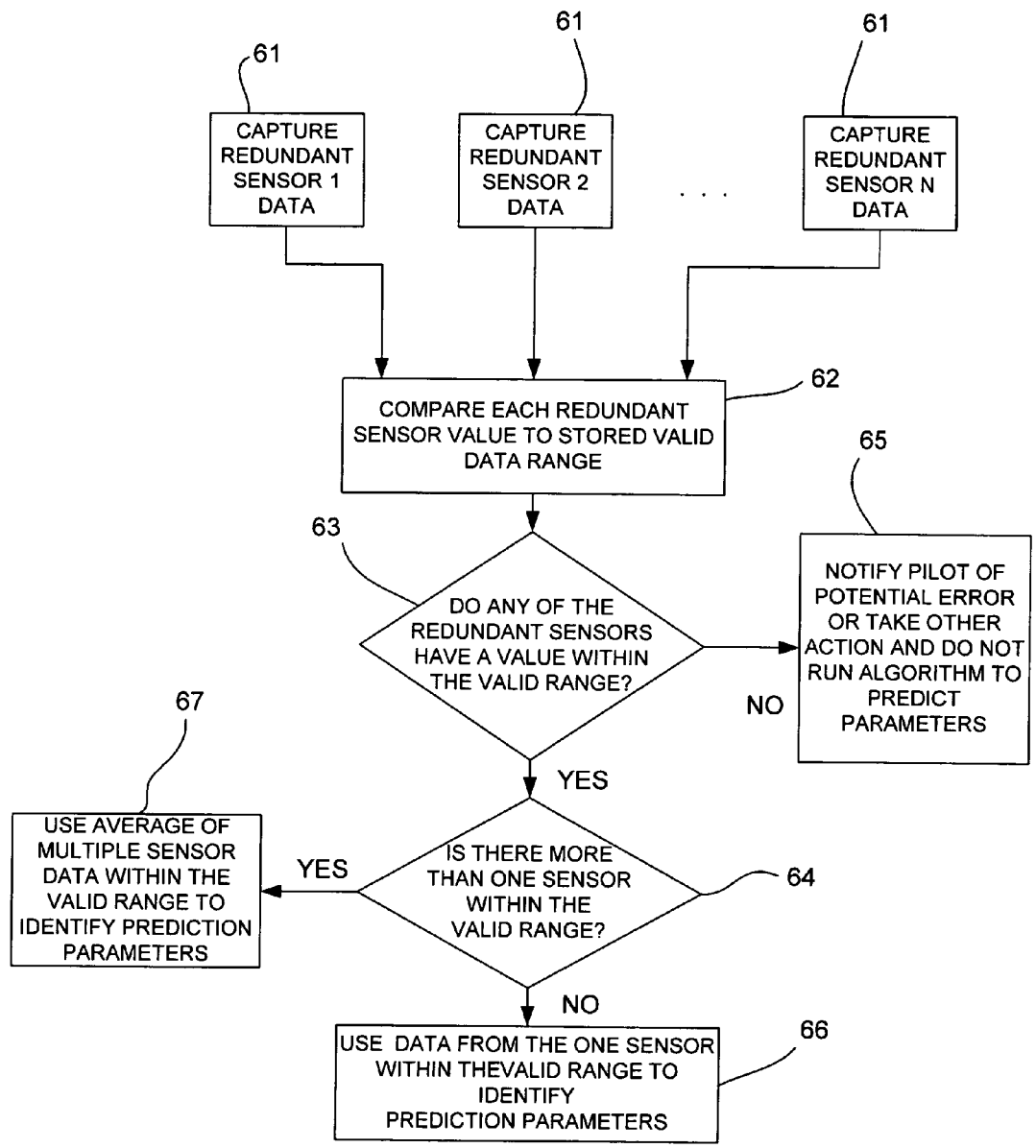
FIG. 6 is a flow chart of a method in which valid redundant sensor measurement data is averaged in accordance with the present invention.

FIG. 6 is a flow chart of a method in which valid redundant sensor measurement data is averaged in accordance with the present invention. In this embodiment the values of each of the redundant sensors are captured at step(s) 61 and compared, at step 62, to retrieved valid data ranges for that type of sensor. One skilled in the art will appreciate, as in the other embodiments, that captured redundant sensor data at step(s) 61 may include pilot entered data. A decision, at step 63, is made based on the comparison. If at least one of the redundant sensors is within the valid range, another decision is made at step 64. If none of the redundant sensors is within the valid range, a pilot is notified or another action, such as updating a database, is taken and the algorithm to identify prediction parameters is not executed (step 65). At step 64 it is determined if more than one sensor is within the valid range. If there is exactly one redundant sensor within the valid range, it is used to identify prediction parameters at step 66. If there are at least two sensors within the valid range, then the average of the multiple sensor values is used to identify the prediction at step 67.

Systems and methods in accordance with the present invention disclosed herein can advantageously improve the accuracy of flight management systems. Parameter prediction algorithms of such systems, based on the thrust-minus-drag aircraft model, are improved for all stages of flight, including a cruise condition, by providing the model with an additional thrust measurement calculated from engine sensor data. Flight management systems are also improved by checking the validity of sensor data and pilot entered data, and comparing redundant sensors.

Embodiments of systems and methods for improving the accuracy of flight management systems have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive. The scope of the invention is to be defined by the claims appended hereto, and by their equivalents.

What is claimed is:

1. A method for enhancing a thrust-minus-drag mathematical model of an aircraft, the thrust-minus-drag mathematical model including a first thrust estimate based on acceleration, the method comprising:
   computing a second thrust estimate that is not zero in cruise from data measured from at least one engine sensor; and
   adding the second thrust estimate to the thrust-minus-drag mathematical model.

2. The method according to claim 1, wherein the second thrust estimate is added to the thrust-minus-drag mathematical model only during an aircraft cruise condition.

3. The method according to claim 1, wherein the at least one engine sensor is a sensor that provides data for at least one of a rotational speed of a low pressure compressor (N1) and a rotational speed of a high pressure compressor (N2).

4. The method according to claim 1, wherein the at least one engine sensor is a sensor that provides engine pressure ratio (EPR) data.

5. The method according to claim 1, wherein the at least one engine sensor is a sensor that provides power level angle (PLA) data.

6. The method according to claim 1, wherein the step of computing a second thrust estimate comprises receiving data measured from engine sensors that provide rotational speed of a low pressure compressor (N1) data, rotational speed of a high pressure compressor (N2) data, engine pressure ratio (EPR) data, and power level angle (PLA) data.

7. The method according to claim 1, further comprising:
   capturing at least one input parameter other than the second thrust estimate;
   retrieving a valid data range for the one input parameter;
   comparing the one input parameter to the valid data range for the input parameter;
   notifying a pilot of a possible error if the input parameter is not within the valid data range; and
   using the input parameter for the mathematical model if it is within the valid data range.

8. The method according to claim 7, further comprising taking an action other than notifying a pilot of a possible error if the input parameter is not within the valid data range.

9. The method according to claim 8, wherein the action other than notifying a pilot of a possible error comprises updating a database if the input parameter is not within the valid data range.

10. The method according to claim 7, wherein the input parameter is sensor data.

11. The method according to claim 7, wherein the input parameter is pilot entered data.

12. The method according to claim 1, further comprising:
   capturing the values of at least two aircraft sensors that measure the same type of data;
   retrieving a tolerance that represents an error for the type of data;
   comparing the values of each of the sensors that measure the same type of data to each other;
   notifying the pilot of a possible error if any two of the sensors that measure the same type of data vary by more than the tolerance that represents an error for the type of data; and
   using the data measured from at least one of the sensors that measure the same type of data for the mathematical model if no two of the sensors that measure the same type of data vary by more than the tolerance that represents an error for the type of data.

13. The method according to claim 12, further comprising taking an action other than notifying a pilot of a possible error if any two of the sensors that measure the same type of data vary by more than the tolerance that represents an error for the type of data.

14. The method according to claim 13, wherein the action other than notifying a pilot of a possible error comprises updating a database if any two of the sensors that measure the same type of data vary by more than the tolerance that represents an error for the type of data.

15. The method according to claim 1, further comprising:
   determining the values of at least two aircraft sensors that measure the same type of data;
   retrieving a valid data range for the type of data;
   comparing the values of each of the sensors that measure the same type of data to a valid data range for the type of data;
   notifying the pilot of a possible error if none of the sensors that measure the same type of data has a value that is within the valid data range for the type of data; and
   using the data measured from at least one of the sensors that measure the same type of data for the mathematical model if the at least one of the sensors that measure the same type of data is within the valid data range for the type of data.

16. The method according to claim 15, further comprising taking an action other than notifying a pilot of a possible error if at least one of the sensors that measure the same type of data does not have a value that is within the valid data range for the type of data.

17. The method according to claim 16, wherein the action other than notifying a pilot of a possible error comprises updating a database if at least one of the sensors that measure the same type of data does not have a value that is within the valid data range for the type of data.

18. The method according to claim 1, further comprising:
   determining the values of at least two aircraft sensors that measure the same type of data;
   retrieving a valid data range for the type of data;
   comparing the values of each of the sensors that measure the same type of data to a valid data range for the type of data;
   notifying the pilot of a possible error if none of the sensors that measure the same type of data has a value that is within the valid data range for the type of data;
   using the data measured from exactly one of the sensors that measure the same type of data for the mathematical model if the exactly one of the sensors that measure the same type of data is the only sensor reporting data within the valid data range for the type of data; and
   using an average of sensor values that measure the same type of data and are within the valid data range for the type of data for the mathematical model.

19. The method according to claim 18, further comprising taking an action other than notifying a pilot of a possible error if at least one of the sensors that measure the same type of data does not have a value that is within the valid data range for the type of data.

20. The method according to claim 19, wherein the action other than notifying a pilot of a possible error comprises updating a database if at least one of the sensors that measure the same type of data does not have a value that is within the valid data range for the type of data.

21. A method for mathematically modeling the performance characteristics of an aircraft comprising:

computing a thrust-minus-drag mathematical model from measured fuel flow data, measured air data, measured attitude and acceleration data and pilot entered data, the thrust-minus-drag mathematical model including a first thrust estimate based on acceleration;

computing a second thrust estimate that is not zero in cruise from data measured from at least one engine sensor; and adding the second thrust estimate to the thrust-minus-drag mathematical model.

22. The method according to claim 21, wherein the second thrust estimate is added to the thrust-minus-drag mathematical model only during an aircraft cruise condition.

23. The method according to claim 21, wherein the at least one engine sensor is a sensor that provides data for at least one of a rotational speed of low pressure compressor (N1) and a rotational speed of a high pressure compressor (N2).

24. The method according to claim 21, wherein the at least one engine sensor is a sensor that provides engine pressure ratio (EPR) data.

25. The method according to claim 21, wherein the at least one engine sensor is a sensor that provides power level angle (PLA) data.

26. The method according to claim 21, wherein the step of computing a second thrust estimate comprises receiving data measured from engine sensors that provide rotational speed of a low pressure compressor (N1) data, rotational speed of a high pressure compressor (N2) data, engine pressure ratio (EPR) data, and power level angle (PLA) data.

27. The method according to claim 21, further comprising:

capturing at least one input parameter other than the second thrust estimate;

retrieving a valid data range for the one input parameter;

comparing the one input parameter to the valid data range for the input parameter;

notifying a pilot of a possible error if the input parameter is not within the valid data range; and using the input parameter for the mathematical model if it is within the valid data range.

28. The method according to claim 27, further comprising taking an action other than notifying a pilot of a possible error if the input parameter is not within the valid data range.

29. The method according to claim 28, wherein the action other than notifying a pilot of a possible error comprises updating a database if the input parameter is not within the valid data range.

30. The method according to claim 27, wherein the input parameter is sensor data.

31. The method according to claim 27, wherein the input parameter is pilot entered data.

32. The method according to claim 21, further comprising:

capturing the values of at least two aircraft sensors that measure the same type of data;

retrieving a tolerance that represents air error for the type of data;

comparing the values of each of the sensors that measure the same type of data to each other;

notifying the pilot of a possible error if any two of the sensors that measure the same type of data vary by more than the tolerance that represents an error for the type of data; and using the data measured from at least one of the sensors that measure the same type of data for the mathematical model if no two of the sensors that measure the same type of data vary by more than the tolerance that represents an error for the type of data.

33. The method according to claim 32, further comprising taking an action other than notifying a pilot of a possible error if any two of the sensors that measure the same type of data vary by more than the percentage that represents an error for the type of data.

34. The method according to claim 33, wherein the action other than notifying a pilot of a possible error comprises updating a database if any two of the sensors that measure the same type of data vary by more than the percentage that represents an error for the type of data.

35. The method according to claim 21, further comprising:

determining the values of at least two aircraft sensors that measure the same type of data;

retrieving a valid data range for the type of data;

comparing the values of each of the sensors that measure the same type of data to a valid data range for the type of data;

notifying the pilot of a possible error if none of the sensors that measure the same type of data have a value that is within the valid data range for the type of data; and using the data measured from at least one of the sensors that measure the same type of data for the mathematical model if the at least one of the sensors that measure the same type of data is within the valid data range for the type of data.

36. The method according to claim 35, further comprising taking an action other than notifying a pilot of a possible error if at least one of the sensors that measure the same type of data does not have a value that is within the valid data range for the type of data.

37. The method according to claim 36, wherein the action other than notifying a pilot of a possible error comprises updating a database if at least one of the sensors that measure the same type of data does not have a value that is within the valid data range for the type of data.

38. The method according to claim 21, further comprising:

determining the values of at least two aircraft sensors that measure the same type of data;

retrieving a valid data range for the type of data;

comparing the values of each of the sensors that measure the same type of data to a valid data range for the type of data;

notifying the pilot of a possible error if none of the sensors that measure the same type of data has a value that is within the valid data range for the type of data;

using the data measured from exactly one of the sensors that measure the same type of data for the mathematical model if the exactly one of the sensors that measure the same type of data is the only sensor reporting data within the valid data range for the type of data; and using an average of sensor values that measure the same type of data and are within the valid data range for the type of data for the mathematical model.

39. The method according to claim 38, further comprising taking an action other than notifying a pilot of a possible error if at least one of the sensors that measure the same type of data does not have a value that is within the valid data range for the type of data.

40. The method according to claim 39, wherein the action other than notifying a pilot of a possible error comprises updating a database if at least one of the sensors that measure the same type of data does not have a value that is within the valid data range for the type of data.

41. A system for mathematically modeling the performance characteristics of an aircraft comprising:
- a thrust-minus-drag filter, whose outputs are used in performance prediction;
- a maximum fuel flow rating filter, whose outputs are used in performance prediction; and
- a mathematical engine model in communication with the thrust-minus-drag filter, wherein the engine model receives engine performance data, and wherein the mathematical engine model provides a thrust estimate that is not zero in cruise to the thrust-minus-drag filter based on engine performance data.

42. The system according to claim 41, wherein the thrust-minus-drag filter is a Kalman filter.

43. The system according to claim 41, wherein the fuel flow rating filter is a Kalman filter.

44. The system according to claim 41, wherein the engine performance data is power level angle (PLA) data.

45. The system according to claim 41, wherein the engine performance data is at least one of a rotational speed of a low pressure compressor (N1) and a rotational speed of a high pressure compressor (N2).

46. The system according to claim 41, wherein the engine performance data is engine pressure ratio (EPR) data.

47. The system according to claim 41, wherein the engine performance data is rotational speed of a low pressure compressor (N1) data, rotational speed of a high pressure compressor (N2) data, engine pressure ratio (EPR) data, and power level angle (PLA) data.

* * * * *